United States Patent [19]

Burley

[11] 4,011,094

[45] Mar. 8, 1977

[54] CEMENTITIOUS COMPOSITIONS CONTAINING MAGNESIUM COMPOUNDS TO PROVIDE SAG RESISTANCE

[75] Inventor: David R. Burley, Cranbury, N.J.

[73] Assignee: Tile Council of America, Inc., Princeton, N.J.

[22] Filed: Jan. 14, 1976

[21] Appl. No.: 649,085

[52] U.S. Cl. .................. 106/93; 106/314; 106/315; 106/89

[51] Int. Cl.$^2$ .......................... C08L 91/00

[58] Field of Search ............ 106/89, 93, 97, 98, 106/314, 315

[56] References Cited

UNITED STATES PATENTS

| | | | |
|---|---|---|---|
| 1,006,725 | 10/1911 | Cramer | 106/89 |
| 2,493,930 | 1/1950 | Ryan | 106/89 |
| 2,695,850 | 11/1954 | Lorenz | 106/315 |
| 2,934,932 | 5/1960 | Wagner | 106/93 X |
| 3,232,778 | 2/1966 | Dean | 106/89 |
| 3,243,307 | 3/1966 | Selden | 106/93 |
| 3,375,869 | 4/1968 | Messenger | 106/89 |
| 3,832,196 | 8/1974 | Broussard et al. | 106/89 |

*Primary Examiner*—Winston A. Douglas
*Assistant Examiner*—John P. Sheehan
*Attorney, Agent, or Firm*—Morgan, Finnegan, Pine, Foley & Lee

[57] ABSTRACT

Hydraulic cementitious compositions are disclosed which have as an additive to provide sag resistance a compound selected from among magnesium oxide having an iodine number of greater than twenty or magnesium hydroxide.

13 Claims, No Drawings

CEMENTITIOUS COMPOSITIONS CONTAINING MAGNESIUM COMPOUNDS TO PROVIDE SAG RESISTANCE

BACKGROUND OF THE INVENTION

This invention relates to cementitious compositions having good sag resistance and flow characteristics. The compositions of the present invention are especially suitable for use as dry-set mortars for the setting and grouting of tiles.

At present, ceramic tiles are set and grouted with dry-set mortars in most instances. A dry-set mortar is a cementitious composition which in the dry state is comprised of a blend of Portland cement, aggregate (e.g., sand, powdered limestone, and the like), and an organic thickening agent. Prior to use, the dry blend is mixed with water in sufficient amounts to provide a suitable viscosity for application.

Dry-set mortars such as the above which are typically used to set and grout tile in thin beds are disclosed in U.S. Pat. No. 2,934,932 and U.S. Pat. No. 3,243,307.

Rubber or polymer latex can also be added to dry blends such as the above to make a mortar. The resulting compositions are known as latex Portland cement mortars. The latex can contain additives in solution which would otherwise form part of the dry blend.

Dry-set mortars provide good workability, good resistance to staining, and sufficient bond strength. All of these properties are required in cementitious compositions which are employed for setting and grouting ceramic tile. In addition, such compositions must also have resistance to sag.

Sag resistance is a term used in the art and defined by a test method that is part of the American National Standard Specification for Dry-Set Portland Cement — A 118.1. The term "sag resistance" is defined as a property or characteristic relating to the ability of a mortar to resist movement under load until a certain load level is reached. This property is very important in dry-set mortars and latex mortars because to be functional, a mortar on the one hand must be in viscous slurry or paste form, while on the other hand the mortar must also be capable of supporting the load imposed upon it by the tiles being set therewith. It is essential that the mortar provide support for the tiles without there being any appreciable sinking of the tiles into the mortar layer during that period in which the mortar undergoes hardening and sets. The property of sag resistance is especially important for wall applications because the mortar must hold the tile in relatively stationary vertical position while the mortar sets.

Most commonly, sag resistance has been provided in dry-set mortars by the use of asbestos, in the form of short fibers which are mixed with the mortars. Illustrative dry-set mortars having fibers to provide sag resistance are disclosed in U.S. Pat. No. 3,030,258 and the above-mentioned U.S. Pat. No. 3,243,307.

Although asbestos fibers and fibers in general have been found to be suitable for providing dry-set mortars with sag-resistant properties, these fibrous materials have drawn criticism for being harmful to human respiratory systems, and their use has recently been limited by national safety laws.

Surprisingly, it has now been discovered that if certain magnesium compounds are added in at least a certain amount to conventional hydraulic cementitious compositions, the resulting compositions possess good sag resistance which is at least comparable to that obtained with the use of asbestos fibers.

SUMMARY OF THE INVENTION

By the present invention, there are provided hydraulic cementitious compositions for use in setting and grouting tile and for use in other applications wherein dry-set mortar type cementitious compositions have been employed previously, e.g., patching cements, stuccos, and the like.

The present invention provides dry-set mortars having the required flow properties, especially sag resistance, which are necessary to set tile, without the use of asbestos fibers or other fibrous materials.

More particularly, the present invention provides hydraulic cementitious compositions which comprise at least 0.5, and preferably between 1.0 and 10% by weight of the dry blend, of an additive to provide sag resistance which is selected from the group consisting of magnesium oxide having an iodine number of greater than twenty and magnesium hydroxide.

Especially preferably, the additive to provide sag resistance will be a magnesium oxide having an iodine number of greater than 20.

In most highly preferred embodiments, the hydraulic cementitious compositions will comprise in the dry blend:

a. from about 25 to about 99% by weight of Portland cement;

b. from about 0 to about 75% by weight of an aggregate material selected from the group consisting of sand, powdered limestone and mixtures thereof;

c. from about 0.2 to about 6.5% by weight of a cellulosic water retentive agent; and d. from about 1 to about 10% by weight of magnesium oxide, said magnesium oxide having an iodine number of greater than twenty.

DETAILED DESCRIPTION OF THE INVENTION

Although the magnesium compound additives of the present invention are useful in a wide variety of conventional cementitious compositions to improve flow properties, they are preferably employed in dry-set mortars for setting and grouting tile.

The magnesium compounds of the present invention can be usefully employed to provide sag resistance in any conventional dry-set mortar compositions. Such dry-set mortars typically comprise Portland cement, aggregate and a water soluble organic thickener. The term "aggregate" is employed herein to mean any relatively hard, inert material which is conventionally used for mixing with a cementing material to form cement, mortar or plaster. Aggregate used in dry-set mortars is usually sand, or powdered limestone, or mixtures of these materials.

The water soluble organic thickener usually used in dry-set mortars is a cellulosic water retentive agent, e.g., methyl cellulose, hydroxyethyl cellulose hydroxypropylcellulose, and the like.

With respect to the magnesium oxide additive to the compositions of this invention, it has been found that the reactivity and bulk density are important characteristics of the magnesium oxide. Magnesium oxides are conventionally classified as light, heavy, medium light, and the like, when referring to their bulk densities. It has been found that magnesium oxide having a heavy bulk density, often referred to as "dead burned" magnesium oxide, does not provide adequate sag resistance in the compositions of this invention. Although the reason is not clear, it is believed that the magnesium oxide reaches this non-reactive "dead burned" state during manufacture.

In contrast to heavy calcined types of magnesium oxide, which are non-reactive, the magnesium oxides added to the compositions of this invention are relatively lighter in bulk density and more reactive. More particularly, only magnesium oxides having iodine numbers of greater than 20 are used. These can vary in bulk density from extra light up to, but not including, heavy. Magnesium oxides having the desired minimum value for iodine number will in no case have a heavy bulk density.

The iodine number of a given sample of magnesium oxide is directly proportional to the reactivity of that sample. Thus, samples of magnesium oxide which have higher iodine numbers, will also have higher reactivities.

The value for the iodine number can be determined from the amount of iodine absorbed from a carbon tetrachloride solution onto a given weight of magnesium oxide. A specific procedure is as follows:

A sample of about 2 grams of magnesium oxide is weighed to the nearest 0.0001 gram, and transferred to a 250-ml Erlenmeyer flask. To the Erlenmeyer flask is added exactly 100 ml. of 0.10 N iodine solution. The mixture is agitated for 30 minutes, and allowed to settle for 5 minutes. The liquid sample is then filtered through glass wool, and 20 ml of the clear supernatant is transferred to another Erlenmeyer flask containing 50 ml of 0.03 N potassium iodide in ethanol solution. This is then titrated with 0.05 N sodium thiosulfate until colorless. A blank is also run.

The iodine number is then calculated as follows:

$$\frac{[\text{Blank titr(ml)} - \text{sample titr(ml)}] \times 0.05 \times 100/20}{\text{wt. of sample}} \times 100 = $$

I. N. (meq./100g)

Suitable magnesium oxides are available commercially. Examples are No. 1782 Magnesia (I.N. 70–75), sold by Michigan Chemical Co.; Stan-Mag MLW (I.N. 45–60), Stan-Mag ELC (I.N. 70), both sold by Harwick Chemical Co.; Elastomag 100 (I.N. 50) and Elastomag 170 (I.N. 83), sold by Morton Chemical Company.

The practical application of the present invention is reported in the following examples wherein a dry blend was first prepared, then mixed with water and tested for sag resistance in accordance with the procedure for measuring "Sag on Vertical Surfaces" from the American National Standard Specification for Dry-Set Portland Cement Mortar — A118.1-1967. The test procedure is as follows:

"Sag on Vertical Surfaces. Prepare mortar as in 5-1.2 and trowel onto the vertical surface of a dry cinder block between guide strips ¼ inch thick. Lightly tap a tile (Type B) onto the mortar surface immediately after applying mortar, with any back ribs on tile vertical. Accurately mark the top edge of the tile and record any downward displacement of the tile measured 2 hours after placement as the Sag."

The following examples are given merely to illustrate the present invention and are not to be construed as limiting.

In the following examples the sag resistance tests were evaluated and reported as follows:

| | |
|---|---|
| 0 to 1/32 in. | = excellent (no sag) |
| 1/32 in. to 1/8 in. | = very good |
| 1/8 in. to 1/4 in. | = good |
| 1/4 in. to 1 in. | = fair |
| 1 in. to complete loss of tile | = poor |
| complete loss of tile | = none |

Values of greater than 1 inch are considered herein to be unacceptable, while values of 1 inch or less are acceptable.

EXAMPLE 1

A dry mortar blend of 400 g. of Portland cement, 200 g. of sand and 3.4 g. of methylcellulose was prepared for each of the additives listed below. To the blend was added 10 g. of additive and 184 g ml of water, and the blend was slaked for 30 minutes.

The resulting compositions were tested for sag resistance as described above. The results are shown as follows:

| Additive | Sag (inches) |
|---|---|
| Magnesium oxide (light)* | 1/16 |
| Magnesium oxide (heavy) | fell off |
| Magnesium hydroxide | 3/4 |
| Aluminum hydroxide | fell off |

*Michigan Chemical Co.'s No. 1782 Magnesia

The light magnesium oxide was also tested at a higher level, by adding 15 g. of the oxide to the dry mortar blend, and 214 ml. of water. The resulting composition was tested for sag resistance and was found to undergo ½ inch sag.

The results show the effectiveness of light magnesium oxide and magnesium hydroxide over the other additives in providing resistance to sag in a dry-set mortar.

EXAMPLE 2

Compositions were prepared as in Example 1, using the same additives except that 60 g. of additive and 232 ml. of water were added to the dry blend. The results are shown as follows:

| Additive | Sag (inches) |
|---|---|
| Magnesium oxide (light) | no sag |
| Magnesium oxide (heavy) | fell off |
| Magnesium hydroxide | ¼ |
| Aluminum hydroxide | fell off |

Similar experiments employing zinc oxide and barium oxide showed that they were ineffective in providing sag resistance.

EXAMPLE 3

The effectiveness of magnesium oxide (light) in providing sag resistance in dry-set mortars is compared with short fiber asbestos as follows:

| | A | B | C | D |
|---|---|---|---|---|
| Portland cement | 48.55 | 48.55 | 38.51 | 38.51 |
| Methylcellulose | 0.6 | 0.6 | 0.48 | 0.48 |
| Sand | 50 | 50 | 50 | 50 |
| Short fiber asbestos | 0.85 | — | 0.68 | — |
| Magnesium oxide (light)* | — | 1.70 | — | 1.35 |
| Water | 25 | 25 | 23 | 23 |

-continued

|  | A | B | C | D |
|---|---|---|---|---|
| Sag (inches) | 1/16 | 1/16 | 1/8 | 1/8 |
| Set time (hrs.)** | 9.5 | 9.8 | 7.0 | 8.2 |

*No. 1782 Magnesia, Michigan Chem. Co.
**Determined in accordance with ANSI A 118.1

It is shown from the above that light magnesium oxide is comparable to short fiber asbestos in providing sag resistance in a dry-set mortar composition.

EXAMPLE 4

The effect of a 1% by weight level of commercially available magnesium oxides on sag resistance was measured and compared, as follows:

Water in the amount of 250 ml. was added to 1000 grams of cement, and the mix was slaked for 30 minutes.

|  | A | B | C | D | E | F | G | H |
|---|---|---|---|---|---|---|---|---|
| Portland cement | 482 | 482 | 482 | 482 | 482 | 482 | 482 | 482 |
| D Sand | 500 | 500 | 500 | 500 | 500 | 500 | 500 | 500 |
| Methyl cellulose 4000 cps 65 HG | 7.5 | 7.5 | 7.5 | 7.5 | 7.5 | 7.5 | 7.5 | 7.5 |
| Michigan Chem No. 1782 | 10 | — | — | — | — | — | — | — |
| Michigan Chem Magmaster No. 1 mesh 1A | — | 10 | — | — | — | — | — | — |
| Harwick Stan-Mg 112-M | — | — | 10 | — | — | — | — | — |
| Harwick Stan-Mg 100 | — | — | — | 10 | — | — | — | — |
| Harwick Stan-Mg 113 | — | — | — | — | 10 | — | — | — |
| Harwick Stan-Mg MLW | — | — | — | — | — | 10 | — | — |
| Harwick Stan-Mg ELC | — | — | — | — | — | — | 10 | — |
| Food grade Magnesium Oxide | — | — | — | — | — | — | — | 10 |
| Sag (inches) | 1/4 | Fell off* | 1/2 | 5/8 | Fell off* | 1 | 5/16 | 3/4 |
| Set Time (hrs.) | 8 | 6 3/4 | 6 | 6 1/2 | 7 1/2 | 7 | 8 1/2 | 7 1/2 |
| Reactivity | HR | LR | MR | HR | LR | MR | MR | MR |
| Density | L | H | M | ML | H | ML | EL | M |

*after 20 minutes
HR = highly reactive   H = Heavy         EL = extra light
MR = medium reactivity M = Medium        ML = medium light
LR = low reactivity    L = Light Other variations and modifications of the present invention are possible in the light of the above description. For instance, although levels of magnesium oxide and magnesium hydroxide of from about 1 to about 10% by weight are specifically illustrated in the examples, these are merely preferred and are not intended to be exclusive. Higher levels may also be used, e.g., in excess of 10%. However, amounts of additive in excess of about 15% by weight of the dry blend will have little further beneficial effect in providing higher sag resistance, and might require the use of undesirably large amounts of water to give a workable viscosity. Generally, it is preferred to add from about 200 to about 500 parts by weight of water per 1,000 parts of dry blend of mortar.

It is to be understood that these and other variations are intended to be within the full scope of the invention as it is defined by the appended claims.

I claim:

1. A dry-set mortar composition having improved sag resistance, said composition being capable of admixture with water, which comprises a Portland cement, a water retentive cellulosic material and as an additive to provide improved sag resistance, at least 0.5% by weight, based on the weight of said composition, of a reactive magnesium oxide having an iodine number of greater than twenty.

2. A dry-set mortar composition as in claim 1 wherein the reactive magnesium oxide additive is present in an amount from about 1.0 to about 10% by weight based on the weight of said composition.

3. A dry-set mortar composition having improved sag resistance, said composition being capable of admixture with water, which comprises a Portland cement, a water retentive cellulosic material and as an additive to provide improved sag resistance, at least 0.5% by weight, based on the weight of said composition, of a compound selected from the group consisting essentially of a reactive magnesium oxide having an iodine number of greater than twenty and magnesium hydroxide.

4. A dry-set mortar composition as in claim 3 wherein the additive to provide improved sag resistance is present in an amount from about 1.0 to about 10% by weight, based on the weight of said composition.

5. A dry-set mortar composition having improved sag resistance, said composition being capable of admixture with water, which comprises:
   a. from about 25 to about 99% by weight of Portland cement;
   b. from about 0 to about 75% by weight of an aggregate material selected from the group consisting of sand, powdered limestone and mixtures thereof;
   c. from about 0.2 to about 6.5% be weight of a cellulosic water retentive agent; and
   d. from about 1 to about 10% by weight of a reactive magnesium oxide, said magnesium oxide having an iodine number of greater than twenty.

6. A dry-set mortar composition as in claim 5 wherein said cellulosic water retentive agent (c) is selected from the group consisting of methyl cellulose, hydroxyethyl cellulose and hydroxpropyl cellulose.

7. A dry-set mortar composition as in claim 5 wherein said composition is admixed with water in a weight ratio of about 1,000 parts of said composition to from about 200 to about 500 parts of water.

8. A dry-set mortar composition as in claim 1 which includes an aggregate material.

9. A dry-set mortar composition as in claim 8 wherein said aggregate is selected from the group consisting of sand, powdered limestone or mixtures thereof.

10. A dry-set mortar composition as in claim 1 wherein said water retentive cellulosic material is selected from the group consisting of methyl cellulose, hydroxethyl cellulose and hydroxypropyl cellulose.

11. A dry-set mortar composition as in claim 3 which includes an aggregate material.

12. A dry-set mortar composition as in claim 11 wherein said aggregate is selected from the group consisting of sand, powdered limestone or mixtures thereof.

13. A dry-set mortar composition as in claim 3 wherein said water retentive cellulosic material is selected from the group consisting of methyl cellulose, hydroxyethyl cellulose and hydroxypropyl cellulose.

* * * * *

UNITED STATES PATENT AND TRADEMARK OFFICE
CERTIFICATE OF CORRECTION

PATENT NO. : 4,011,094
DATED : March 8, 1977
INVENTOR(S) : David R. Burley

It is certified that error appears in the above-identified patent and that said Letters Patent are hereby corrected as shown below:

In Col. 6, line 58, change "hydroxpropyl" to read -- hydroxypropyl --.

In Col. 7, line 4, change "hydroxethyl" to read -- hydroxyethyl --.

Signed and Sealed this nineteenth Day of July 1977

[SEAL]

Attest:

RUTH C. MASON
Attesting Officer

C. MARSHALL DANN
Commissioner of Patents and Trademarks